J. C. WHITRIDGE & G. T. JOHNSON.
BRAKE ARRANGEMENT FOR SIX WHEEL TRUCKS.
APPLICATION FILED MAY 9, 1917.
1,232,145. Patented July 3, 1917.
2 SHEETS—SHEET 1.
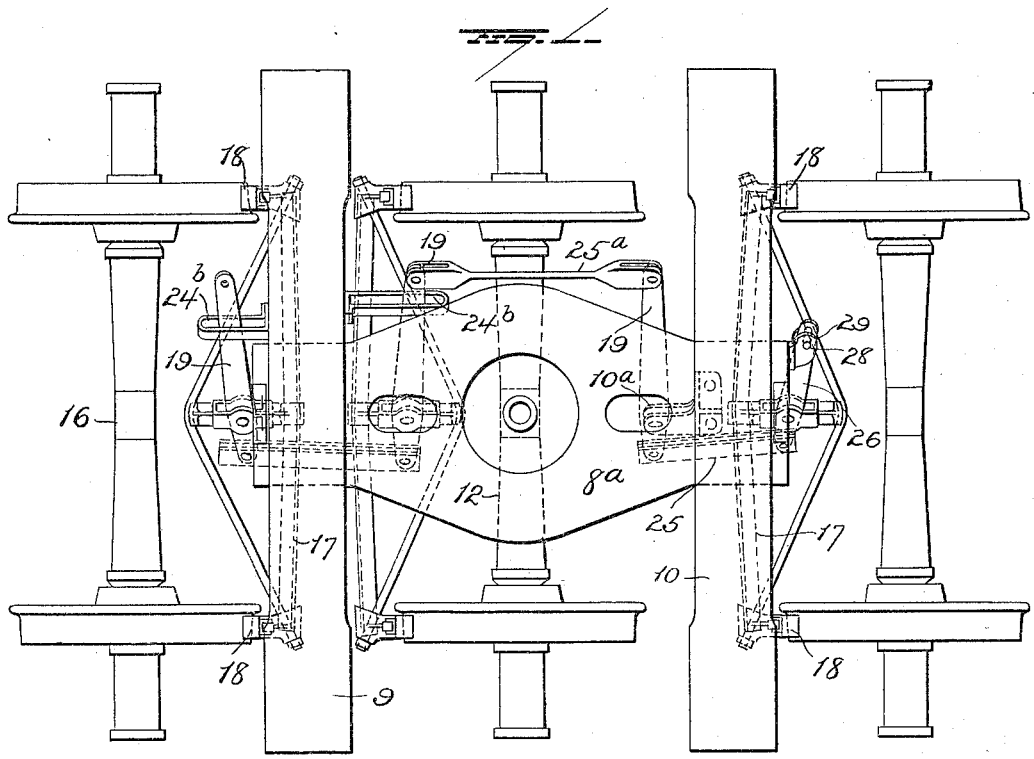
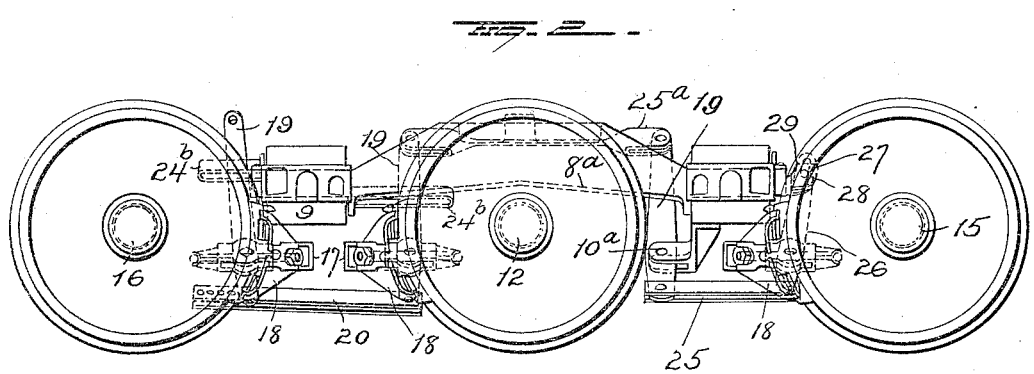
WITNESSES
INVENTORS
Attorneys

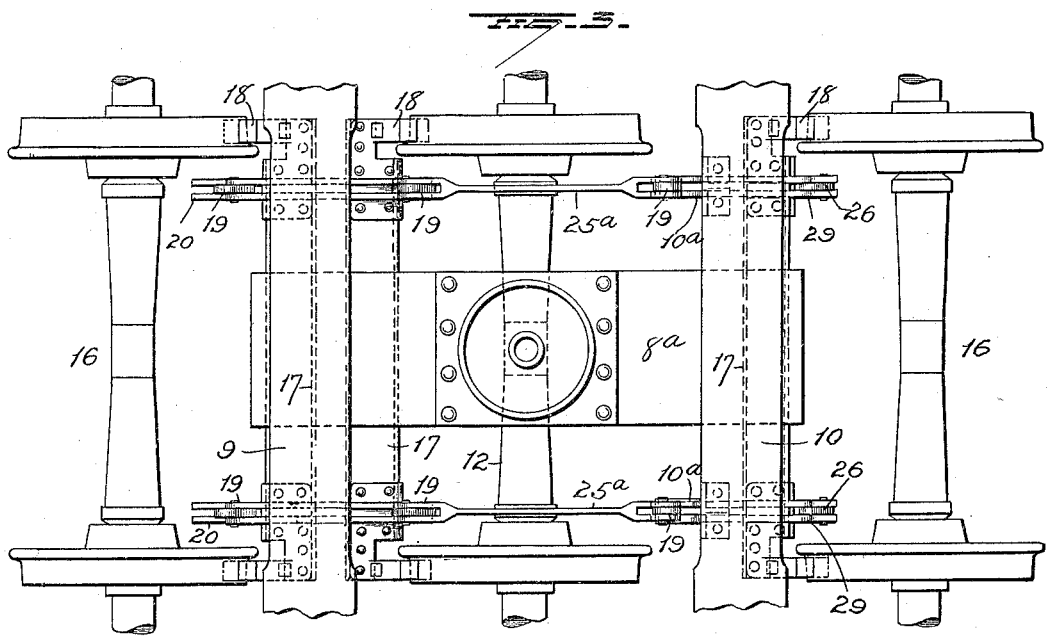
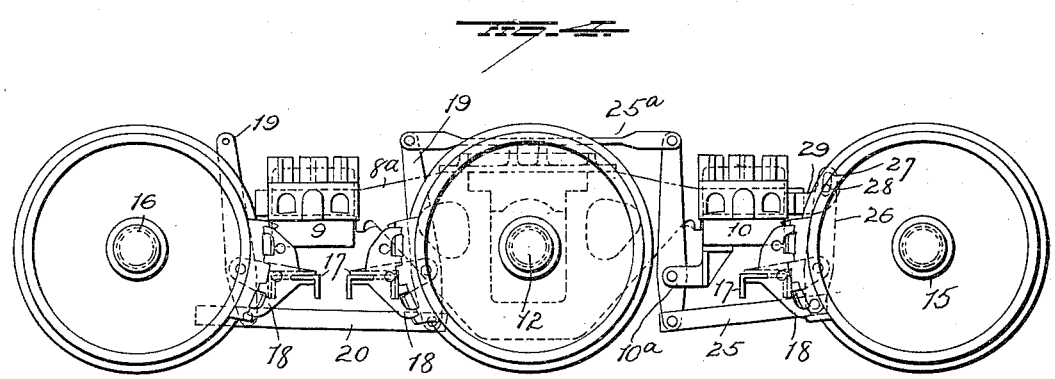

UNITED STATES PATENT OFFICE.

JOHN C. WHITRIDGE AND GEORGE T. JOHNSON, OF COLUMBUS, OHIO, ASSIGNORS TO THE BUCKEYE STEEL CASTINGS COMPANY, OF COLUMBUS, OHIO.

BRAKE ARRANGEMENT FOR SIX-WHEEL TRUCKS.

1,232,145.     Specification of Letters Patent.     Patented July 3, 1917.

Original application filed April 21, 1916, Serial No. 92,639. Divided and this application filed May 9, 1917. Serial No. 167,516.

*To all whom it may concern:*

Be it known that we, JOHN C. WHITRIDGE and GEORGE T. JOHNSON, citizens of the United States, and residents of Columbus, in the county of Franklin and State of Ohio, have invented certain new and useful Improvements in Brake Arrangements for Six-Wheel Trucks; and we do hereby declare the following to be a full, clear, and exact description of the invention, such as will enable others skilled in the art to which it appertains to make and use the same.

Our invention relates to an improvement in brake arrangement for six wheel trucks, adapted particularly for use with the truck shown in Patent No. 1,153,741 granted to us September 14th, 1915, and is a division of application No. 92,639 filed by us April 21st, 1916.

The object of the invention is to provide a construction that will be comparatively simple and that will equalize the brake pressure on all wheels at the same time, and it consists in the parts and combinations of parts as will be more fully explained and pointed out in the claims.

In the accompanying drawings; Figure 1 is a view in plan of a truck embodying our invention; Fig. 2 is a view in side elevation of the same and Figs. 3 and 4 are views in plan and side elevation respectively of a modified construction.

This improvement is designed particularly for six wheel trucks wherein a main bolster $8^a$ is supported at its ends on the auxiliary bolsters 9 and 10.

The main bolster $8^a$ extends lengthwise the truck and is mounted at its ends on seats formed in or on the auxiliary bolsters 9 and 10. These latter bolsters extend transversely of the truck, one being located in a plane between the axle 15 and the middle axle 12, and the other between the middle axle 12 and the axle 16, and each is preferably provided with an opening located centrally with relation to its ends for the reception of the ends of the main bolster $8^a$.

The brake beams 17 are hung from the truck side frames and the brake shoes 18 are keyed to the brake beams in the usual manner.

In the construction shown in Figs. 1 and 2 the brake beams 17 are actuated by the levers 19, disposed diagonally so that their upper ends are to one side of the main bolster $8^a$, and all connections between the levers and the chains or rod from the brake actuating mechanism on the body of the car, will be at one side of the main bolster and in a plane above the auxiliary bolster so that all of said parts will be readily accessible and be clear of all parts of the truck.

The lever 19 located between the middle axle 12 and the auxiliary bolster 10, is pivoted to the bracket $10^a$ and is connected at its lower end by the compression member 25 to the lower end of lever 26 which latter is provided at its upper end with an oblong slot 27 for the passage of pin 28 carried by the bracket 29. This lever 26 is connected centrally intermediate its ends to the adjacent brake beam.

The upper end of said lever 19 is connected at its upper end with the upper end of the lever 19, located intermediate the central axle and auxiliary bolster 9, by the tension member $25^a$. The levers 19 at opposite sides of the bolster 9 are pivotally connected intermediate their ends to their respective brake beams 17, and are connected at their lower ends by the compression member 20, the upper end of the lever 19 at the outer side of the bolster 9 being free for the attachment thereto of the brake mechanism of the car.

The floating levers 19 at the opposite sides of bolster 9 preferably pass through the looped guides $24^b$, secured to said bolster, which guides operate to prevent any undue sidewise or swinging movement of the said levers.

The construction shown in Figs. 3 and 4 is identical with that shown in Figs. 1 and 2 except that the levers are arranged in pairs, two to each brake beam and are vertical, instead of diagonally disposed.

With this construction it will be seen that when a pulling stress is exerted on the upper ends of the two levers at the outer side of bolster 9, the brake shoes of all three brake beams will be forced into contact with their respective wheels, and as the entire equipment is flexible, the brake pressure on all the wheels will be the same, by properly proportioning the various levers.

In each of the above forms the brake mechanism is wholly outside of the main and auxiliary bolsters, and is consequently readily accessible for repairs or readjustment, and with the arrangements shown it is possible by properly proportioning the levers to equalize the brake pressure or get the same brake pressure on all the wheels at the same time.

It is evident that many slight changes might be resorted to in the relative arrangement of parts shown and described without departing from the spirit and scope of our invention. Hence we would have it understood that we do not wish to confine ourselves to the exact construction and arrangement of parts shown and described, but Having fully described our invention what we claim as new and desire to secure by Letters-Patent, is:—

1. In a brake rigging for six wheel trucks the combination of a main bolster and auxiliary bolsters supporting the main bolster, a lever having a pivot point at its upper end, a brake beam pivotally connected to said lever between the extremities thereof, a compression member connecting the lower end of said lever with the lower end of a second lever having a pivot point between its extremities, a tension member connecting the upper end of said lever with the upper end of a third lever, a second brake beam pivotally connected to said third lever between the extremities thereof, a compression member pivotally connecting the lower end of the latter lever with the lower end of a fourth lever, and a third brake beam pivotally connected to said fourth lever, between the extremities thereof, the upper end of said lever being free for the attachment of the brake mechanism of the car body.

2. In a brake rigging for six wheel trucks, the combination of a main bolster and auxiliary bolsters supporting the main bolster, levers each pivoted at its upper end, a brake beam connected to said levers between the extremities thereof, compression members connecting the lower ends of said levers with the lower ends of a second pair of levers, each of the latter being pivoted intermediate its ends, tension members connecting the upper ends of said second levers with the upper ends of a third pair of levers, a second brake beam connected to said third pair of levers between the extremities thereof, compression members connecting the lower ends of the third pair of levers with the lower ends of a fourth pair of levers, and a third brake beam connected to said latter levers between the ends thereof, the upper ends of the fourth pair of levers being free for the attachment of the brake mechanism of the car body.

In testimony whereof, we have signed this specification in the presence of two subscribing witnesses.

JOHN C. WHITRIDGE.
GEORGE T. JOHNSON.

Witnesses:
JOHN W. LEYSHON,
C. E. EBERT.